United States Patent
Hicks et al.

(10) Patent No.: US 11,513,366 B2
(45) Date of Patent: Nov. 29, 2022

(54) AUDIO EYEGLASSES WITH DOUBLE-DETENT HINGE

(71) Applicant: Bose Corporation, Framingham, MA (US)

(72) Inventors: Brandon Leo Hicks, Ludlow, MA (US); Annu Kuriakose, Waltham, MA (US); Dallas Robert Tharrett, Norfolk, MA (US)

(73) Assignee: Bose Corporation, Framingham, MA (US)

( * ) Notice: Subject to any disclaimer, the term of this patent is extended or adjusted under 35 U.S.C. 154(b) by 351 days.

(21) Appl. No.: 16/851,730

(22) Filed: Apr. 17, 2020

(65) Prior Publication Data

US 2021/0240007 A1    Aug. 5, 2021

Related U.S. Application Data

(63) Continuation-in-part of application No. 16/778,132, filed on Jan. 31, 2020.

(51) Int. Cl.
*H04R 1/00*    (2006.01)
*G02C 5/22*    (2006.01)
(Continued)

(52) U.S. Cl.
CPC ............. *G02C 5/2227* (2013.01); *G02C 1/00* (2013.01); *G02C 11/10* (2013.01); *H04R 1/08* (2013.01); *H04R 1/105* (2013.01); *G02C 5/02* (2013.01)

(58) Field of Classification Search
CPC ........ G02C 5/2227; G02C 1/00; G02C 11/10; G02C 5/02; G02C 5/22; G02C 11/06;
(Continued)

(56) References Cited

U.S. PATENT DOCUMENTS 5,606,743 A * 2/1997 Vogt ...................... H04B 1/086
    351/158
6,769,767 B2 * 8/2004 Swab ..................... G02C 11/10
    351/158

(Continued)

FOREIGN PATENT DOCUMENTS

CN    201673332 U    12/2010
EP    1001302 A1     5/2000
(Continued)

OTHER PUBLICATIONS

PCT International Search Report and Written Opinion for International Application No. PCT/US2021/026182, dated Jul. 8, 2021, 15 pages.

(Continued)

*Primary Examiner* — Matthew A Eason
(74) *Attorney, Agent, or Firm* — Hoffman Warnick LLC

(57) ABSTRACT

Various aspects include audio eyeglasses with a frame including: a lens region; a pair of arms extending from the lens region; a hinge coupling each of the pair of arms with the lens region; and a cable extending through each hinge, where each hinge includes: a body defining a cavity accommodating the cable; and a hinge mechanism within the body, the hinge mechanism having: a spring located in the lens region, the spring including at least one lever arm extending within the cavity; and a cam member contacting the lever arm of the spring, where the cam member includes: a first contact surface for resisting kickback from the spring when the audio eyeglasses are in a fully open position, and a second, distinct contact surface for resisting kickback from the spring when the audio eyeglasses are in a fully closed position.

20 Claims, 16 Drawing Sheets

(51) Int. Cl.
*G02C 11/00* (2006.01)
*H04R 1/08* (2006.01)
*H04R 1/10* (2006.01)
*G02C 1/00* (2006.01)
*G02C 5/02* (2006.01)

(58) Field of Classification Search
CPC ...... H04R 1/08; H04R 1/105; H04R 2420/07; H04R 5/0335; H04R 1/1066
See application file for complete search history.

(56) References Cited

U.S. PATENT DOCUMENTS

| | | | | |
|---|---|---|---|---|
| 9,740,023 | B1* | 8/2017 | Ashwood | G06F 1/163 |
| 10,353,221 | B1* | 7/2019 | Graff | H04R 1/105 |
| 10,761,346 | B1* | 9/2020 | Yang | G02B 27/0176 |
| 2002/0163486 | A1* | 11/2002 | Ronzani | G02B 27/017 |
| | | | | 345/87 |
| 2007/0121061 | A1* | 5/2007 | Kim | G02C 5/10 |
| | | | | 351/41 |
| 2007/0248238 | A1* | 10/2007 | Abreu | G02C 11/10 |
| | | | | 381/381 |
| 2008/0013041 | A1 | 1/2008 | Chou | |
| 2009/0180194 | A1* | 7/2009 | Yamaguchi | G02B 27/0176 |
| | | | | 359/15 |
| 2010/0045928 | A1* | 2/2010 | Levy | G02C 11/10 |
| | | | | 351/158 |
| 2010/0110368 | A1* | 5/2010 | Chaum | G02C 11/10 |
| | | | | 351/158 |
| 2010/0177277 | A1* | 7/2010 | Kokonaski | G02C 5/14 |
| | | | | 320/108 |
| 2012/0127420 | A1 | 5/2012 | Blum et al. | |
| 2012/0262667 | A1* | 10/2012 | Willey | G02C 5/14 |
| | | | | 351/158 |
| 2013/0235331 | A1* | 9/2013 | Heinrich | G02C 11/10 |
| | | | | 351/158 |
| 2013/0250135 | A1* | 9/2013 | Blum | A61F 2/1613 |
| | | | | 348/211.99 |
| 2014/0028966 | A1* | 1/2014 | Blum | G02C 11/10 |
| | | | | 351/153 |
| 2016/0048036 | A1* | 2/2016 | Cazalet | G02C 5/2236 |
| | | | | 16/228 |
| 2017/0108713 | A1* | 4/2017 | Blum | H01R 33/945 |
| 2018/0049664 | A1* | 2/2018 | Miyazaki | G02C 5/22 |
| 2018/0070812 | A1* | 3/2018 | Miyazaki | G02C 11/00 |
| 2018/0095299 | A1* | 4/2018 | Cazalet | G02C 5/12 |
| 2019/0235274 | A1* | 8/2019 | Jouard | G02C 5/2272 |
| 2020/0041821 | A1 | 2/2020 | Graff et al. | |
| 2020/0174281 | A1* | 6/2020 | Gui | H01Q 1/273 |
| 2021/0240013 | A1* | 8/2021 | Hicks | G02C 5/143 |
| 2021/0263334 | A1* | 8/2021 | Moskowitz | H05K 7/20445 |

FOREIGN PATENT DOCUMENTS

| | | |
|---|---|---|
| FR | 2703477 A1 | 10/1994 |
| WO | 2013188805 A2 | 12/2013 |
| WO | 2020028529 A1 | 2/2020 |

OTHER PUBLICATIONS

PCT International Search Report and Written Opinion for International Application No. PCT/US2021/015399, dated Mar. 25, 2021, 14 pages.

* cited by examiner

AUDIO EYEGLASSES WITH DOUBLE-DETENT HINGE

PRIORITY CLAIM

This application claims priority to, and is a continuation-in-part of, U.S. patent application Ser. No. 16/778,132 ("Wearable Audio Device with Cable-Through Hinge, filed on Jan. 31, 2020), the entire contents of which are incorporated by reference.

TECHNICAL FIELD

This disclosure generally relates to audio eyeglasses. More particularly, the disclosure relates to audio eyeglasses with motion limiting hinges.

BACKGROUND

The electronics contained within audio eyeglasses present mechanical and design challenges that are not present in conventional eyeglasses. For example, the weight of transducers, microphones, control circuitry, and associated wiring can impact ergonomics and use of the audio eyeglasses.

SUMMARY

All examples and features mentioned below can be combined in any technically possible way.

Various implementations of the disclosure include audio eyeglasses with a double-detent hinge mechanism. Certain implementations include a cam member with a set of contact surfaces for directing force from a spring to separately maintain the audio eyeglasses in a fully closed position, and a fully open position, respectively.

In certain particular aspects, audio eyeglasses include: a frame for resting on a head of a user, the frame having: a lens region; a pair of arms extending from the lens region; a hinge coupling each of the pair of arms with the lens region; and a cable extending through each hinge, where each hinge includes: a body defining a cavity accommodating the cable; and a hinge mechanism within the body, the hinge mechanism having: a spring located in the lens region, the spring having at least one lever arm extending within the cavity; and a cam member contacting the lever arm of the spring, where the cam member has: a first contact surface for resisting kickback from the spring when the audio eyeglasses are in a fully open position, and a second, distinct contact surface for resisting kickback from the spring when the audio eyeglasses are in a fully closed position.

In some particular aspects, audio eyeglasses include: a frame for resting on a head of a user, the frame having: a lens region; a pair of arms extending from the lens region; a hinge coupling each of the pair of arms with the lens region; and a cable extending through each hinge, where each hinge includes: a body defining a cavity accommodating the cable; and a hinge mechanism within the body, the hinge mechanism having: a spring located in the lens region, the spring including at least one lever arm extending within the cavity; and a cam member contacting the lever arm of the spring, where the cam member includes a notch along a contact surface for resisting kickback from the spring when the audio eyeglasses are in a fully closed position.

In other particular aspects, audio eyeglasses include: a frame for resting on a head of a user, the frame having: a lens region; a pair of arms extending from the lens region; a hinge coupling each of the pair of arms with the lens region; and a cable extending through each hinge, where each hinge includes: a body defining a cavity accommodating the cable; and a hinge mechanism within the body, the hinge mechanism having: a spring located in the lens region, the spring having at least one lever arm extending within the cavity; and a cam member contacting the lever arm of the spring, where the cam member includes a set of contact surfaces for directing a force from the at least one lever arm to separately maintain the audio eyeglasses in a fully closed position, and a fully open position, respectively.

Implementations may include one of the following features, or any combination thereof.

In certain implementations, the first contact surface has a first surface profile and the second contact surface has a second, distinct surface profile.

In particular cases, the second contact surface has a notch that limits an area of contact with the at least one lever arm.

In some aspects, in the fully closed position, the at least one lever arm applies a force to the second contact surface to maintain the fully closed position regardless of an orientation of the audio eyeglasses.

In particular implementations, in the fully open position, the at least one lever arm applies a force to the first contact surface to maintain the fully open position regardless of an orientation of the audio eyeglasses.

In certain cases, the audio eyeglasses include a pin about which the cam is configured to rotate, where the cam includes a vertically extending hole accommodating the pin.

In some aspects, the spring includes a double-torsion spring.

In particular cases, the lever arm includes a notch in a contact surface that complements a protrusion in the second contact surface.

In certain implementations, the audio eyeglasses further include: an electro-acoustic transducer at least partially housed in the frame and including a sound-radiating surface for providing an audio output.

In some aspects, the audio eyeglasses further include at least one microphone in the frame, where the hinge permits movement of the additional section relative to the first section.

In particular implementations, the cavity has a first opening to a pathway in the lens region, and a second opening to an additional pathway in the arm, where the cable includes a printed circuit board (PCB), and where the PCB is thinner in a region contained within the hinge than in a distinct region within the pathway or the additional pathway.

In certain aspects, the cam member has a bend for resisting kickback from the spring when the audio eyeglasses are in a fully open position.

In some cases, the cam includes a protrusion adjacent to the notch.

In particular implementations, in the fully closed position, the at least one lever arm contacts the cam member only at the protrusion.

In certain cases, the lever arm includes a notch in a contact surface to complement a protrusion in the second contact surface.

Two or more features described in this disclosure, including those described in this summary section, may be combined to form implementations not specifically described herein.

The details of one or more implementations are set forth in the accompanying drawings and the description below.

Other features, objects and advantages will be apparent from the description and drawings, and from the claims.

Figure 1:
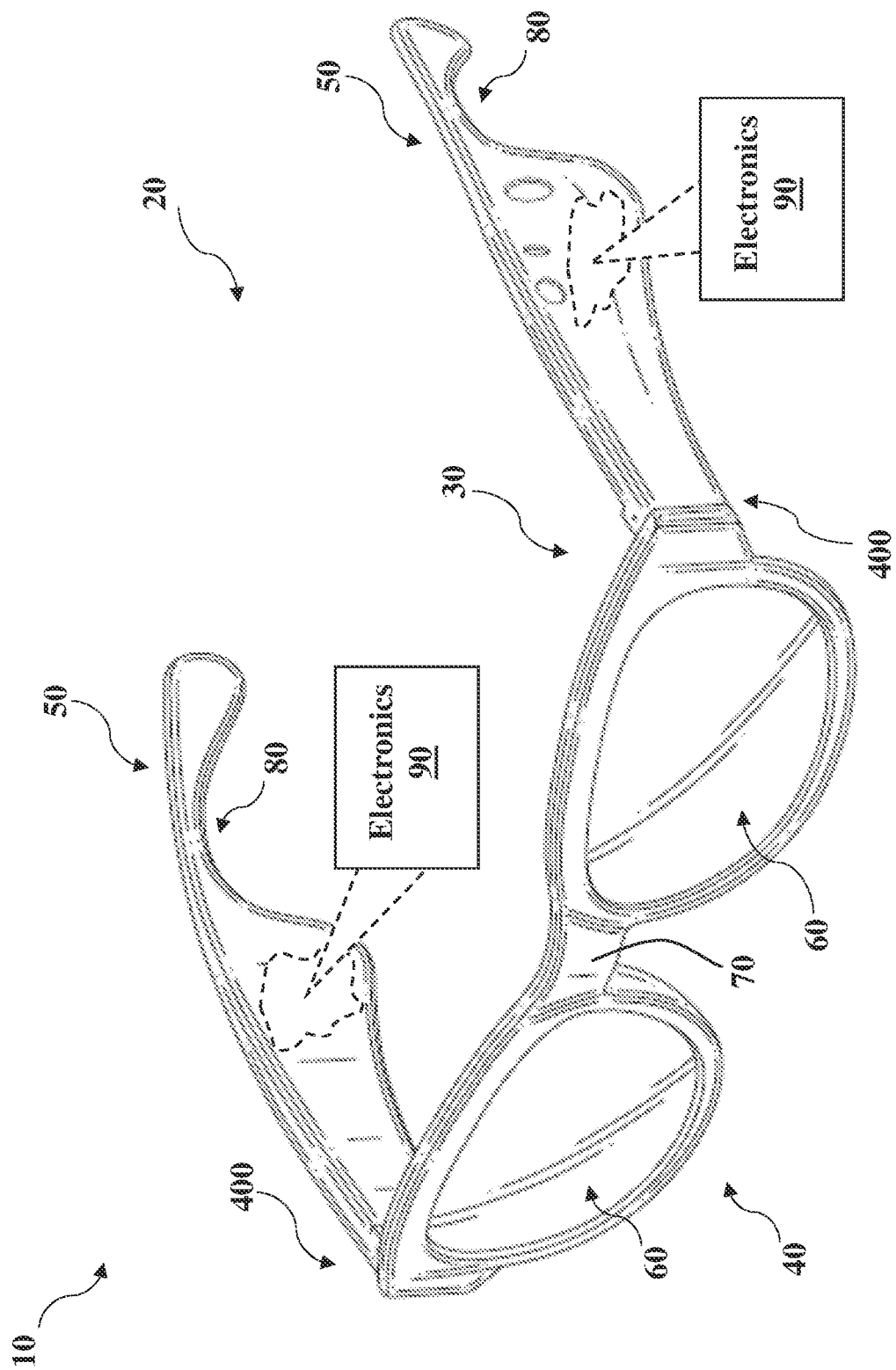
FIG. 1 shows a schematic depiction of a wearable audio device according to various implementations.

It is noted that the drawings of the various implementations are not necessarily to scale. The drawings are intended to depict only typical aspects of the disclosure, and therefore should not be considered as limiting the scope of the invention. In the drawings, like numbering represents like elements between the drawings.

DETAILED DESCRIPTION

As noted herein, various aspects of the disclosure generally relate to audio eyeglasses with motion limiting hinges. More particularly, aspects of the disclosure relate to audio eyeglasses with a cam member that includes a set of contact surfaces for directing force from a spring to separately maintain the audio eyeglasses in a fully closed position, and a fully open position, respectively.

Commonly labeled components in the FIGURES are considered to be substantially equivalent components for the purposes of illustration, and redundant discussion of those components is omitted for clarity. Numerical ranges and values described according to various implementations are merely examples of such ranges and values, and are not intended to be limiting of those implementations. In some cases, the term "approximately" is used to modify values, and in these cases, can refer to that value +/−a margin of error, such as a measurement error. It is understood that the terms "inboard" and "outboard" are used to describe the radial location of components relative to the central axis (A), such that relative to the axis (A), a component that is radially inboard of a distinct component is closer to the central axis (A) on a radial (perpendicular) line that extends from the axis (A). The term "radially oriented" can be used to refer to a component, line, or plane that is perpendicular to an axis such as a central axis (A).

Components shown and described herein can be formed according to various manufacturing techniques, for example, molding, casting, additive manufacturing (e.g., 3D printing), etc. Where specific techniques are not described, conventional manufacturing approaches can be used to form the components and structures disclosed according to various implementations. Particular implementations include manufacturing approaches such as overmolding, where a first portion of the component (substrate) is partially or fully covered by a subsequently formed portion of the component (overmold).

Aspects and implementations disclosed herein may be applicable to a wide variety of speaker systems, such as wearable audio devices in various form factors, with particular application to audio eyeglasses or other head-mounted audio devices. Unless specified otherwise, the term wearable audio device, as used in this document, includes headphones and various other types of personal audio devices such as head, shoulder or body-worn acoustic devices that include one or more acoustic drivers to produce sound, with or without contacting the ears of a user. Some aspects disclosed may be particularly applicable to personal (wearable) audio devices such as audio eyeglasses or other head-mounted audio devices. It should be noted that although specific implementations of speaker systems primarily serving the purpose of acoustically outputting audio are presented with some degree of detail, such presentations of specific implementations are intended to facilitate understanding through provision of examples and should not be taken as limiting either the scope of disclosure or the scope of claim coverage.

Aspects and implementations disclosed herein may be applicable to speaker systems that either do or do not support two-way communications, and either do or do not support active noise reduction (ANR). For speaker systems that do support either two-way communications or ANR, it is intended that what is disclosed and claimed herein is applicable to a speaker system incorporating one or more microphones disposed on a portion of the speaker system that remains outside an ear when in use (e.g., feedforward microphones), on a portion that is inserted into a portion of an ear when in use (e.g., feedback microphones), or disposed on both of such portions. Still other implementations of speaker systems to which what is disclosed and what is claimed herein is applicable will be apparent to those skilled in the art.

Particular example implementations relate to off-ear headphones that produce sound using an acoustic driver that is spaced (or, separated) from the ear of the user while in use. Examples of off-ear headphones with dipole loudspeakers are disclosed in U.S. Pat. No. 9,794,676 and U.S. patent application Ser. No. 15/375,119, both of which are herein incorporated by reference in their entireties. Additional aspects of off-ear headphones are described in U.S. patent application Ser. No. 15/884,924 and U.S. patent application Ser. No. 15/992,982, both of which are herein also incorporated by reference in their entirety. Additionally, designs of particular off-ear headphones are included in U.S. Design patent application No. 29/639,191 (Attorney Docket No. OG-18-041-US), which is herein also incorporated by reference in its entirety. Even further, examples of wearable audio device hinges are disclosed in U.S. patent application Ser. No. 16/442,813, which is herein also incorporated by reference in its entirety.

The wearable audio devices disclosed herein can include additional features and capabilities not explicitly described. That is, the wearable audio devices described according to various implementations can include features found in one or more other wearable electronic devices, such as smart glasses, smart watches, etc., or any other wearable audio device where wiring to components (e.g., printed circuit board assembly/assemblies (PCBA) and/or other electronic components such as an electro-acoustic transducer) must pass through a hinge. These wearable audio devices can include additional hardware components, such as one or more cameras, location tracking devices, microphones, etc., and may be capable of voice recognition, visual recognition, and other smart device functions. The description of wearable audio devices included herein is not intended to exclude these additional capabilities in such a device.

FIG. 1 is a schematic depiction of a wearable audio device 10 according to various implementations. In this example implementation, the wearable audio device 10 is a pair of audio eyeglasses 20. As shown, the wearable audio device 10 can include a frame 30 having a first section (e.g., lens section) 40 and at least one additional section (e.g., arm sections) 50 extending from the first section 40. In this example, as with conventional eyeglasses, the first (or, lens) section 40 and additional section(s) (arms) 50 are designed for resting on the head of a user. In this example, the lens section 40 can include a set of lenses 60, which can include prescription, non-prescription and/or light-filtering lenses, as well as a bridge 70 (which may include padding) for resting on the user's nose. Arms 50 can include a contour 80 for resting on the user's respective ears.

Contained within the frame 30 (or substantially contained, such that a component can extend beyond the boundary of the frame) are electronics 90 and other components for controlling the wearable audio device 10 according to particular implementations. In some cases, separate, or duplicate sets of electronics 90 are contained in portions of the frame, e.g., each of the respective arms 50 in the frame 30. However, certain components described herein can also be present in singular form.

Figure 2:
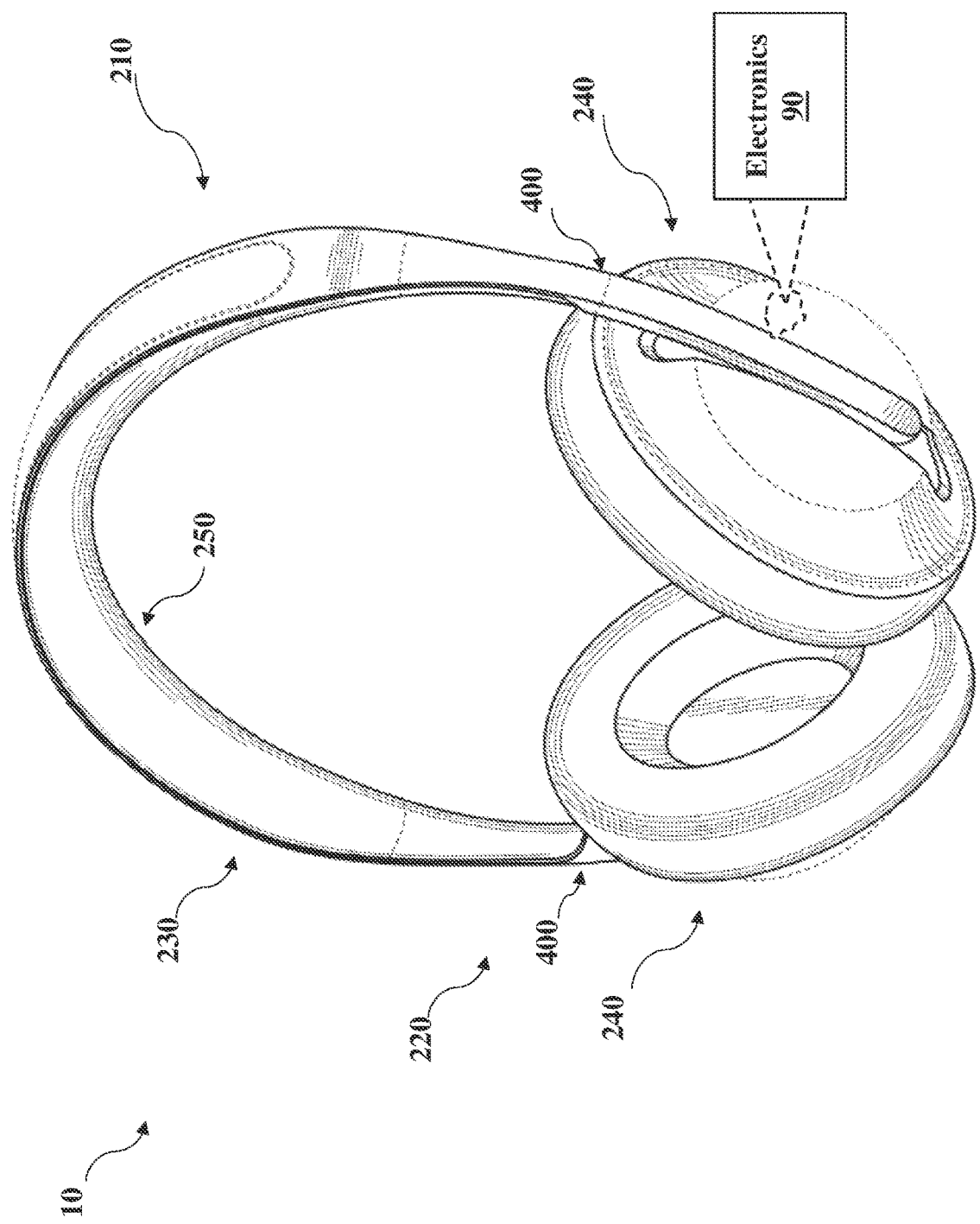
FIG. 2 is a schematic depiction of a wearable audio device according to various additional implementations.

While various implementations described herein refer to wearable audio devices in the form of audio eyeglasses, it is understood that the disclosed principles can be equally applied to a number of wearable audio devices in different form factors. For example, FIG. 2 depicts another example wearable audio device 10 in the form of headphones 210. In some cases, the headphones 210 include on-ear or around-ear headphones 210. The headphones 210 can include a frame 220 with a first section (e.g., headband) 230 and at least one additional section (e.g., earcup(s)) 240 extending from the first section 230. In various implementations, the headband 230 includes a head cushion 250. Stored within one or both of the earcups 240 are electronics 90 and other components for controlling the wearable audio device 10 according to particular implementations.

Figure 3:
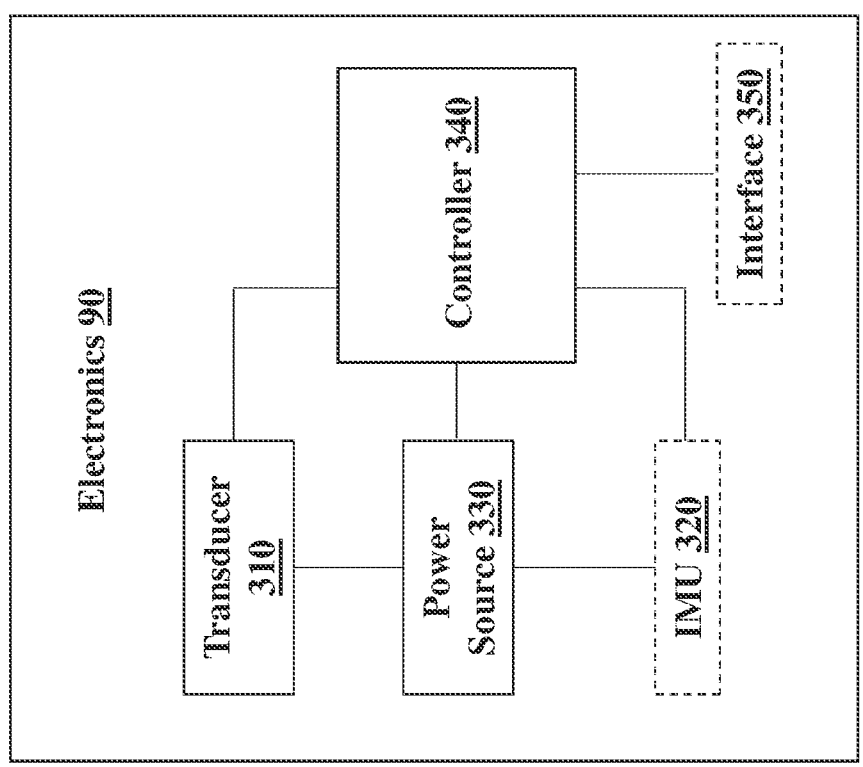
FIG. 3 is a schematic depiction of select electronics substantially contained in the wearable audio devices of FIGS. 1 and 2.

FIG. 3 shows a schematic depiction of the electronics 90 contained within the frame 30 (FIG. 1) and/or the frame 220 (FIG. 2). It is understood that one or more of the components in electronics 90 may be implemented as hardware and/or software, and that such components may be connected by any conventional means (e.g., hard-wired and/or wireless connection). It is further understood that any component described as connected or coupled to another component in the wearable audio device 10 or other systems disclosed according to implementations may communicate using any conventional hard-wired connection and/or additional communications protocols. In various particular implementations, separately housed components in wearable audio device 10 are configured to communicate using one or more conventional wireless transceivers.

As shown in FIG. 3, electronics 90 contained within the frame 20 (FIG. 1) can include a transducer 310 (e.g., electro-acoustic transducer), an inertial measurement unit (IMU) 320 (optional, depicted in phantom), and a power source 330. In various implementations, the power source 330 is connected to the transducer 310, and can additionally be connected to the IMU 320. Each of the transducer 310, IMU 320 and power source 330 are connected with a controller 340, which is configured to perform control functions according to various implementations described herein. Electronics 90 can include other components not specifically depicted herein, such as communications components (e.g., a wireless transceiver (WT)) configured to communicate with one or more other electronic devices connected via one or more wireless networks (e.g., a local WiFi network, Bluetooth connection, or radio frequency (RF) connection), and amplification and signal processing components. It is understood that these components or functional equivalents of these components can be connected with, or form part of, the controller 340. In additional optional implementations, the electronics 90 can include an interface 350 coupled with the controller 340 for enabling functions such as audio selection, powering on the audio eyeglasses or engaging a voice control function. In certain cases, the interface 350 includes a button, a compressible interface and/or a capacitive touch interface. Various additional functions of the electronics 90 are described in U.S. patent application Ser. No. 16/442,813, previously incorporated by reference herein.

Shown in FIGS. 1 and 2, the wearable audio device 10 can include a hinge 400 coupling the first section (e.g., lens section 40 in FIG. 1, or headband 230 in FIG. 2) with the additional section(s) (e.g., arms 50 in FIG. 1, or earcups 240 in FIG. 2). In various implementations, the wearable audio device 10 includes multiple hinges 400, e.g., between a lens section 40 and each of the arms 50 in the audio eyeglasses 20 (FIG. 1), or between the headband 230 and each of the earcups 240 (FIG. 2). In the example of the audio eyeglasses 20, a portion of the hinge 400 can be fixed within a slot in the lens section 40.

In various implementations, as noted herein, the hinge 400 is configured to enable wiring to run therethrough, for example, between sections in the wearable audio device 10. As described herein, one or more portions of the frame 20, as well as the hinge 400, can be formed substantially of a plastic or composite material.

Figure 4:
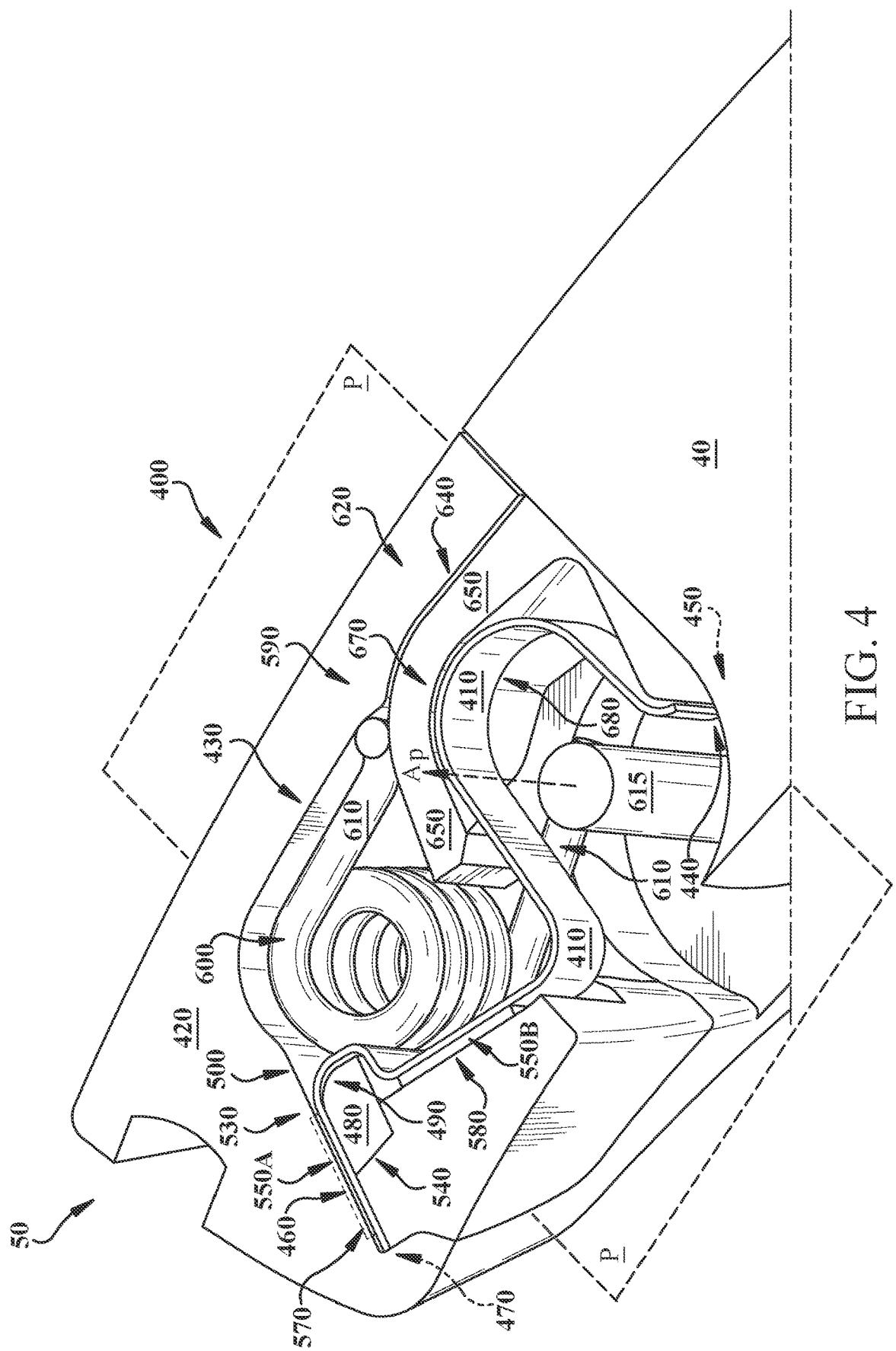
FIG. 4 shows a cut-away perspective view of a hinge in a wearable audio device according to various implementations.
Figure 5:
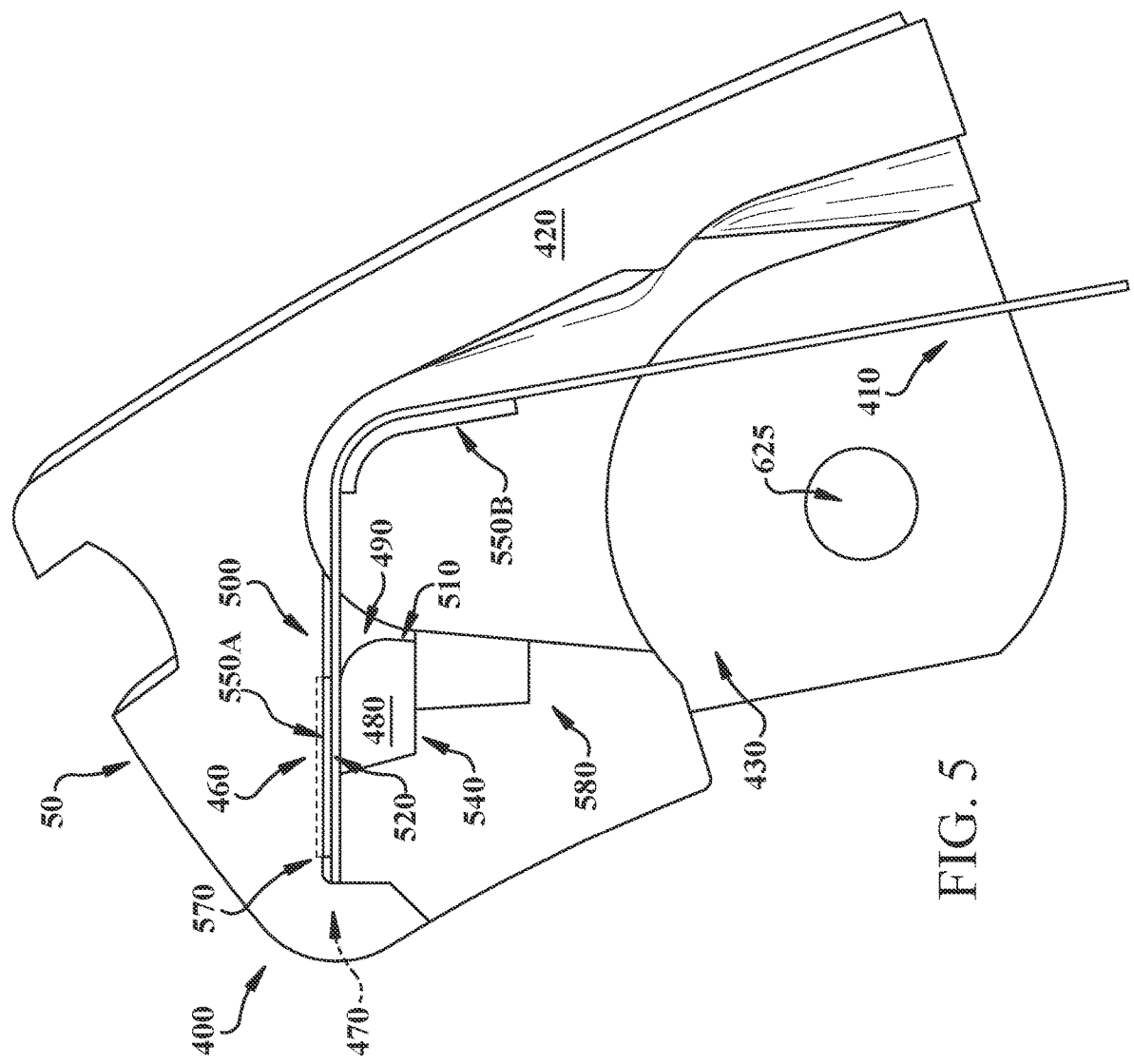
FIG. 5 is a plan view of a portion of the hinge in FIG. 4.
Figure 6:
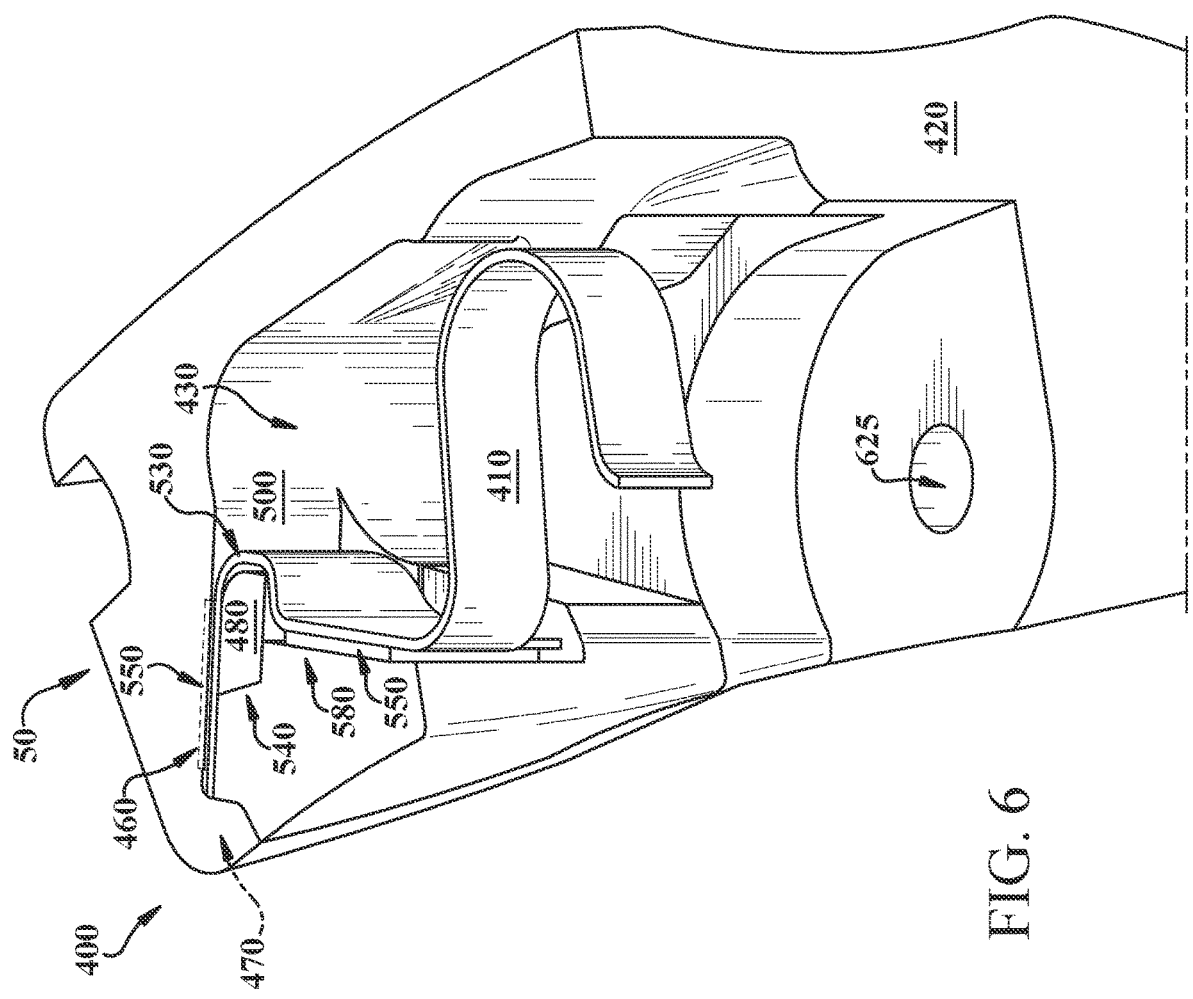
FIG. 6 is a perspective view of a portion of a hinge according to various implementations.
Figure 7:
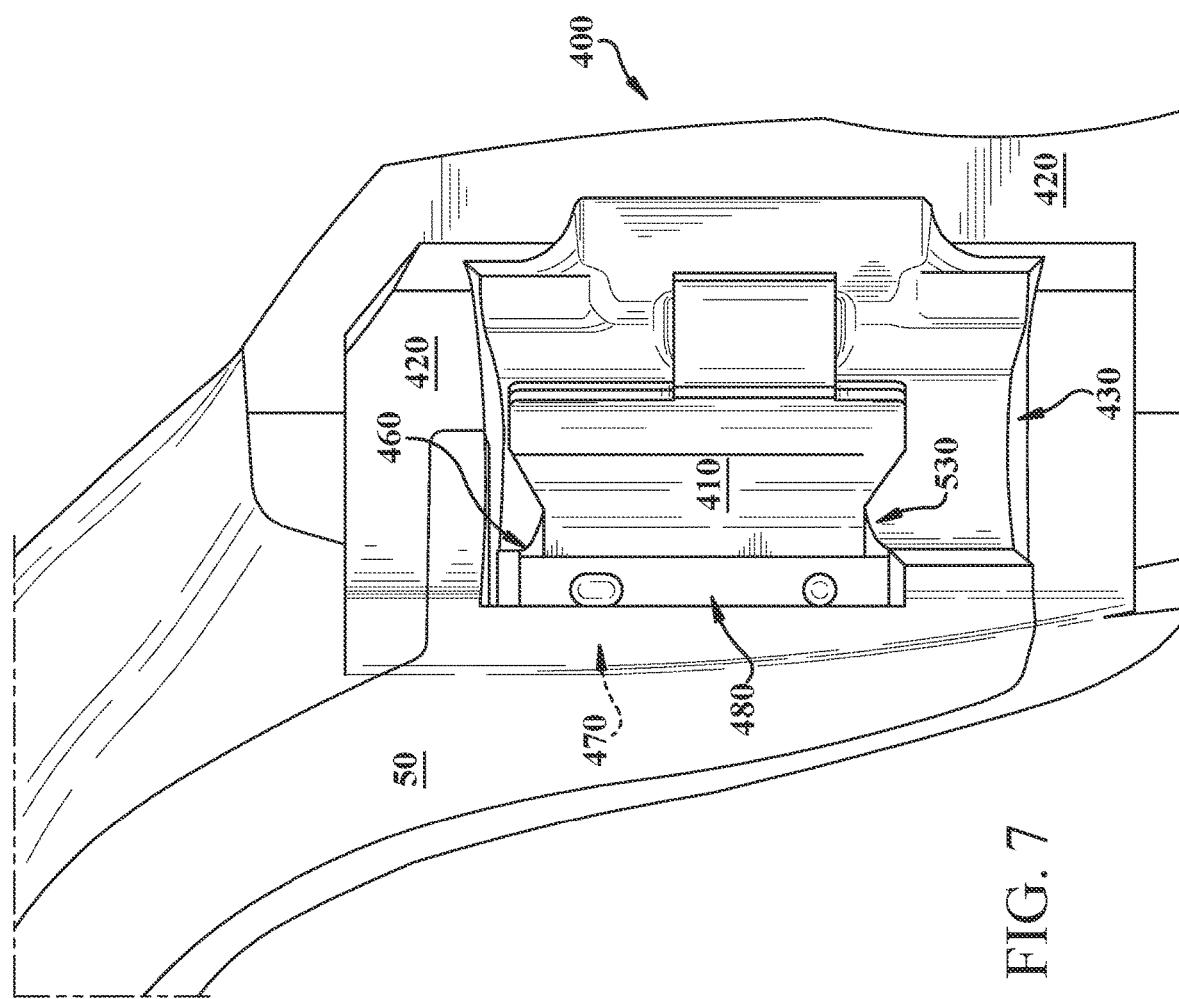
FIG. 7 is a perspective view of another portion of a hinge according to various implementations.

Turning to FIG. 4, a cut-away perspective view of the hinge 400 is shown according to various implementations. In the example depiction of the audio eyeglasses 20 in FIG. 1, the hinge 400 is shown joining the lens section 40 with arms 50. In particular cases, the hinge 400 is integral with each of the arm(s) 50. In other implementations, portions of the hinge 400 are integral with each of the lens section 40 and the arms 50, respectively. In the depiction of the hinge 400 in FIG. 4, the hinge 400 is in a substantially open position. As discussed further herein, the hinge 400 can permit movement (e.g., pivoting) of the first section of the wearable audio device 10 (FIGS. 1 and 2) relative to an additional section of the wearable audio device 10, but can be configured to accommodate a cable 410 extending through the hinge 400, e.g., to connect to one or more components in the electronics 90 (FIG. 1) in device sections. FIG. 5 illustrates a different cut-away perspective view of the hinge 400, removing illustration of the hinge mechanism and cable management feature that are present in FIG. 4. FIG. 6 shows the hinge 400 during a preliminary formation process. FIG. 7 is a perspective view of a portion of the hinge 400 and the cable 410 where the cable 410 enters the arm 50 of the audio eyeglasses 20 in FIG. 1. These FIGURES are referred to simultaneously.

As illustrated in FIG. 4, the hinge 400 can include a body 420 defining a cavity 430 for accommodating the cable 410. The body 420 can be formed of one or more conventional materials used in the eyeglasses industry, such as plastics or composites. The cavity 430 is sized to accommodate the cable 410 extending therethrough, i.e., the cavity 430 has a first opening 440 to a pathway 450 (obstructed in these views) in the first section (e.g., lens section 40, FIG. 1) and a second opening 460 to an additional pathway 470 (obstructed in these views) in the additional section (e.g., arm section 50, FIG. 1). In various implementations, the cable 410 includes a flexible printed circuit (FPC) for connecting different components in the electronics 90, and/or connecting electronics 90 in different sections of the wearable audio device 10 (FIG. 1, FIG. 2). In certain implementations where the cable 410 includes an FPC, that FPC can include a single-layer or multi-layer FPC. In other cases, the cable 410 includes one or more wire(s), or one or more cable(s), which may be packaged in an assembly. In some particular cases, the cable 410 (e.g., FPC, wire(s), and/or cable(s)) is thinner in a region contained within the hinge 400 than in a distinct region within the pathway 450 or the additional pathway 470. In these implementations where the cable 410 has a non-uniform thickness, thinner section(s) of the cable 410 reside within the hinge 400 than in other sections of the wearable audio device 10.

In various implementations, the hinge 400 includes an insert 480 located within the body 420 that is adjacent to the second opening 460. In particular cases, the insert 480 has an arcuate surface 490 that faces an opposing inner wall 500 of the cavity 430. However, in other cases, the arcuate surface 490 is a beveled or chamfered edge between approximately perpendicular sides 510, 520 (FIG. 5) of the insert 480. As described herein, the insert 480 defines a minimum radius of a bend 530 (FIG. 4, FIG. 6) in the cable 410 within the cavity 430. In particular cases, the arcuate surface 490 defines the minimum radius of the bend 530 in the cable 410, such that the cable 410 contacts the arcuate surface 490 along approximately an entirety of the length of that surface 490. The minimum radius of this bend 530 is defined within the hinge 400. That is, the hinge 400 is overmolded on the cable 410 such that the body 420 surrounds the portion of the cable 410 extending through the cavity 430. Additionally, the body 420 of the hinge 400 is overmolded on the insert 480, such that the body 420 surrounds the insert 480. In particular implementations, the body 420 includes an overmolded plastic, and the insert 480 is non-unitary with the body 420. That is, the insert 480 and the body 420 are originally formed as separate components. In certain cases, the body 420 and/or the insert 480 are formed of a plastic such as polycarbonate, acrylonitrile butadiene styrene, and/or polyamide. In particular implementations, the insert 480 is more rigid than the body 420, however, this is not necessary in all implementations. In various embodiments, the insert 480 fits in a slot 540 in the body 420. In other particular implementations, the insert 480 is insert-molded into the body 420, e.g., at the slot 540.

In certain implementations, the hinge 400 further includes one or more adhesive strip(s) 550 that couple the cable 410 to the hinge body 420. In certain implementations, the hinge 400 includes two distinct adhesive strips 550 coupling the cable 410 to distinct portions of the hinge body 420. In some cases, a first adhesive strip 550 couples the cable 410 to the body 420 proximate the second opening 460, e.g., ahead of the bend 530 when viewed from the second opening 460 into the body 420. This first adhesive strip 550A (FIG. 4) can be coupled to a first interior wall 570 of the body 420 that is located adjacent the insert 480. A second example adhesive strip 550B is shown coupling the cable 410 to a second interior wall 580 of the body 420 that is located past the bend 530 when viewed from the first opening 440 into the body 420. That is, the adhesive strips 550 couple the cable 410 to the body 420 on both sides of the insert 480. In some cases, the adhesive strips 550 couple the cable 410 to the body 420 on opposite sides of the cable 410. FIG. 5 illustrates the cable 410 with adhesive strips 550 and the insert 480 prior to applying the second adhesive strip 550B to the second interior wall 580. FIG. 6 illustrates the cable 410 after the second adhesive strip 550B is coupled with the second interior wall 580. FIG. 7 shows the cable 410 in isolation with the insert 480 in a portion of the body 420, for example, to illustrate the bend 530.

Returning to FIG. 4, it is understood that the minimum radius of the bend 530 is controlled by the insert 480 within the body 420 of the hinge 400, such that the cable 410 is bent at a defined radius prior to exiting the hinge 400, e.g., at the opening 460. This is in contrast to conventional overmolded cable configurations, where poorly defined bending occurs at the entry/exit of the component (e.g., hinge) or in a portion of the device where the cable is exposed. This can cause stress on the cable, as well as expose the cable to unwanted ambient conditions. That is, the overmolded cable configuration in the wearable audio devices 10 depicted herein can control the minimum radius of the bend 530 in the cable 410, which in certain implementations, is located within the body of the hinge 400, e.g., prior to exiting the hinge 400.

With continuing reference to FIG. 4, in various implementations the wearable audio device 10 further includes a hinge mechanism 590 contained within the body 420. In various implementations, the hinge mechanism 590 includes a spring, a set of interlocking arms or a tension member for enabling controlled movement of the second section (e.g., arm section 50) relative to the first section (e.g., lens section 40). It is understood that the hinge mechanism 590 can include any hinge component(s) that permit controlled rotation of a first section relative to a second section. In certain cases, as illustrated in the example in FIG. 4, the hinge mechanism 590 includes a spring (e.g., coil spring such as a double torsion spring) 600 with a pair of lever arms 610 for controlling movement of the arm section 50 relative to the lens section 40. In certain cases, the spring 600 controls movement around a pin 615 or other pivot point (pin slot 625 shown in FIGS. 5 and 6). In particular cases, the hinge mechanism 590 has a primary axis (Ap) about which the arm section 50 moves relative to the lens section 40. In some cases, where the hinge mechanism includes a spring 600, the primary axis (Ap) is the axis about which the lever arms pivot (or, rotate). In some examples, the cable 410 wraps around the hinge mechanism 590 radially outboard relative to the primary axis (Ap).

The wearable audio device 10 can further include a cable management feature 620 contained within the body 420 of the hinge 400. In some cases, the cable management feature 620 utilizes the pin 615 extending vertically through the hinge 400 about which the cable 410 is routed. In some cases, the cable management feature 620 additionally, or alternatively, includes an arm 640 that extends within the cavity 430 and controls movement of the cable 410 as the arm 50 moves relative to lens section 40 (e.g., in the example depiction in FIG. 4). For example, the arm 640 can include a hook-shaped tab with a first section 650 and a second section 660 extending from the first section 650 at an angle. In particular implementations, the sections of the arm 640 form an arcuate interface 670 for introducing a second bend 680 in the cable 410. In some examples, as illustrated in FIG. 4, as the arm (of the audio eyeglasses) 50 moves relative to the lens section 40, the arm (of the cable management feature) 640 contacts a surface of the cable 410 and maintains the second bend 680 in the cable 410. In certain implementations, the cable management feature 620 remains in contact with the cable 410 throughout approximately an entire range of motion of the hinge 400.

In some examples, as shown in FIG. 4, the hinge mechanism 590, cable management feature 620 and cable 410 are all located in a common plane. In these examples, the common plane (P) is radially oriented relative to the primary axis (Ap) of the hinge mechanism 590, that is, the common plane (P) is perpendicular to the primary axis (Ap). In other words, a common plane (P) exists that runs perpendicular to the primary axis (Ap) and intersects each of the hinge mechanism 590, cable management feature 620 and cable 410. This is in contrast to conventional hinge mechanisms that dedicate separate axially oriented space to cable management, hinge mechanism and/or cable(s). In various implementations, aligning components in a common plane (P) can reduce the footprint of the hinge 400, simplify manufacturing processes for the hinge 400, and/or improve the robustness of the hinge 400.

Figure 8:
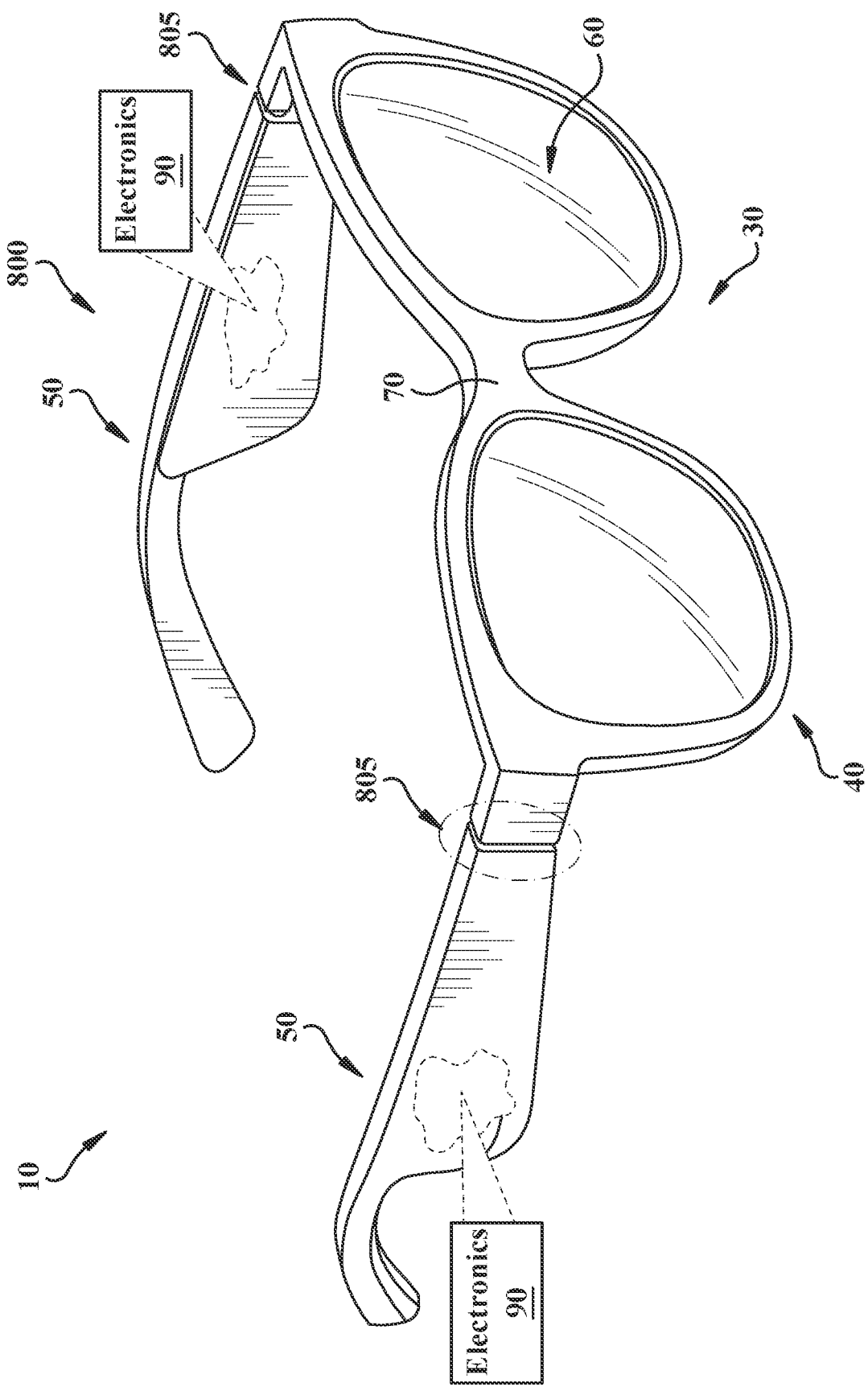
FIG. 8 is a schematic depiction of a wearable audio device according to various additional implementations.

FIG. 8 shows an additional implementation of an audio device 10, for example, a pair of audio eyeglasses 800. In these cases, the audio eyeglasses 800 can include a number of common features with the audio eyeglasses 20 depicted and described with reference to FIGS. 1 and 3. Redundant explanation of these components is omitted.

Figure 9:
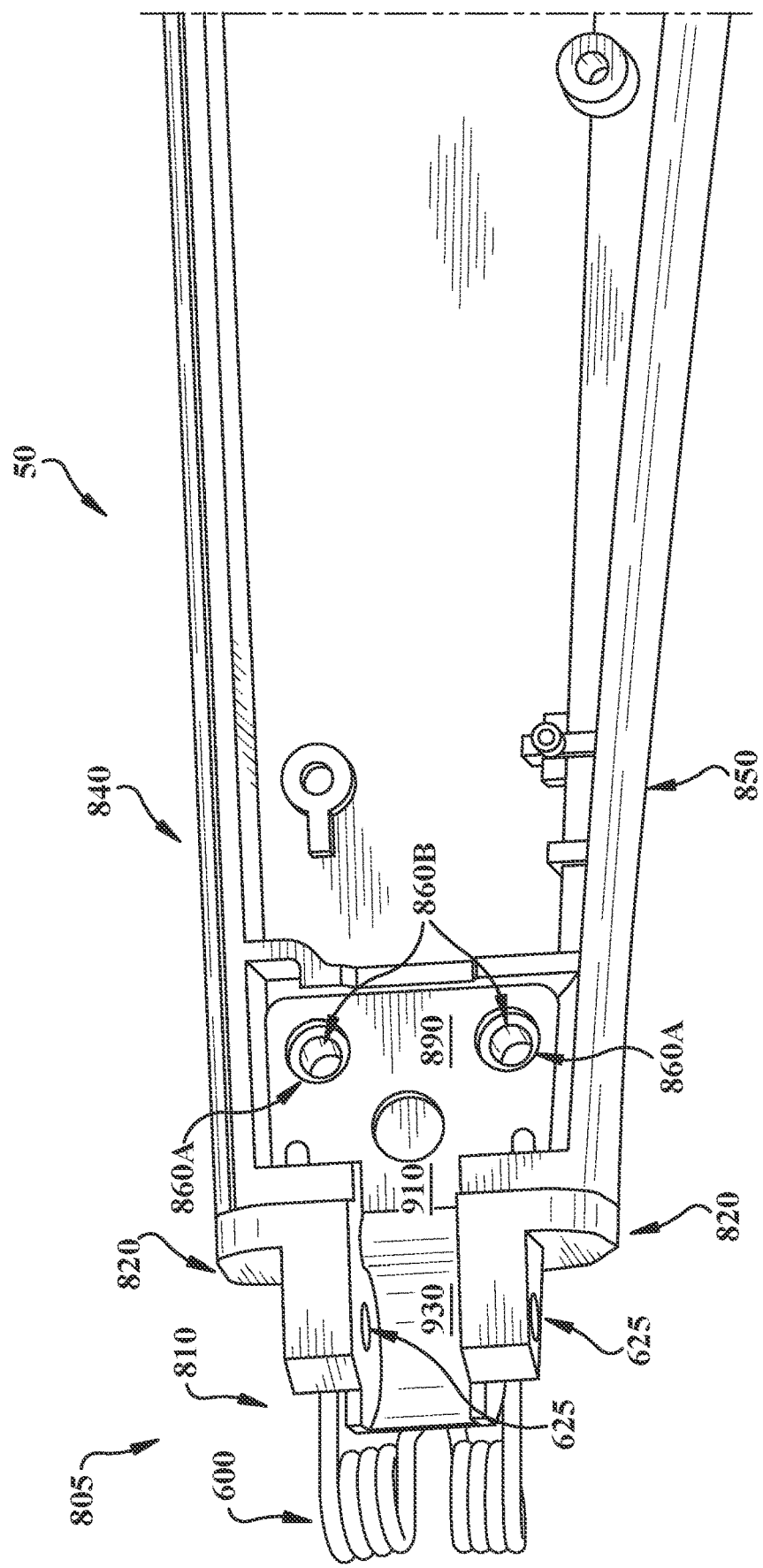
FIG. 9 shows a cut-away perspective of a hinge coupled with a section of a wearable audio device according to various implementations.
Figure 10:
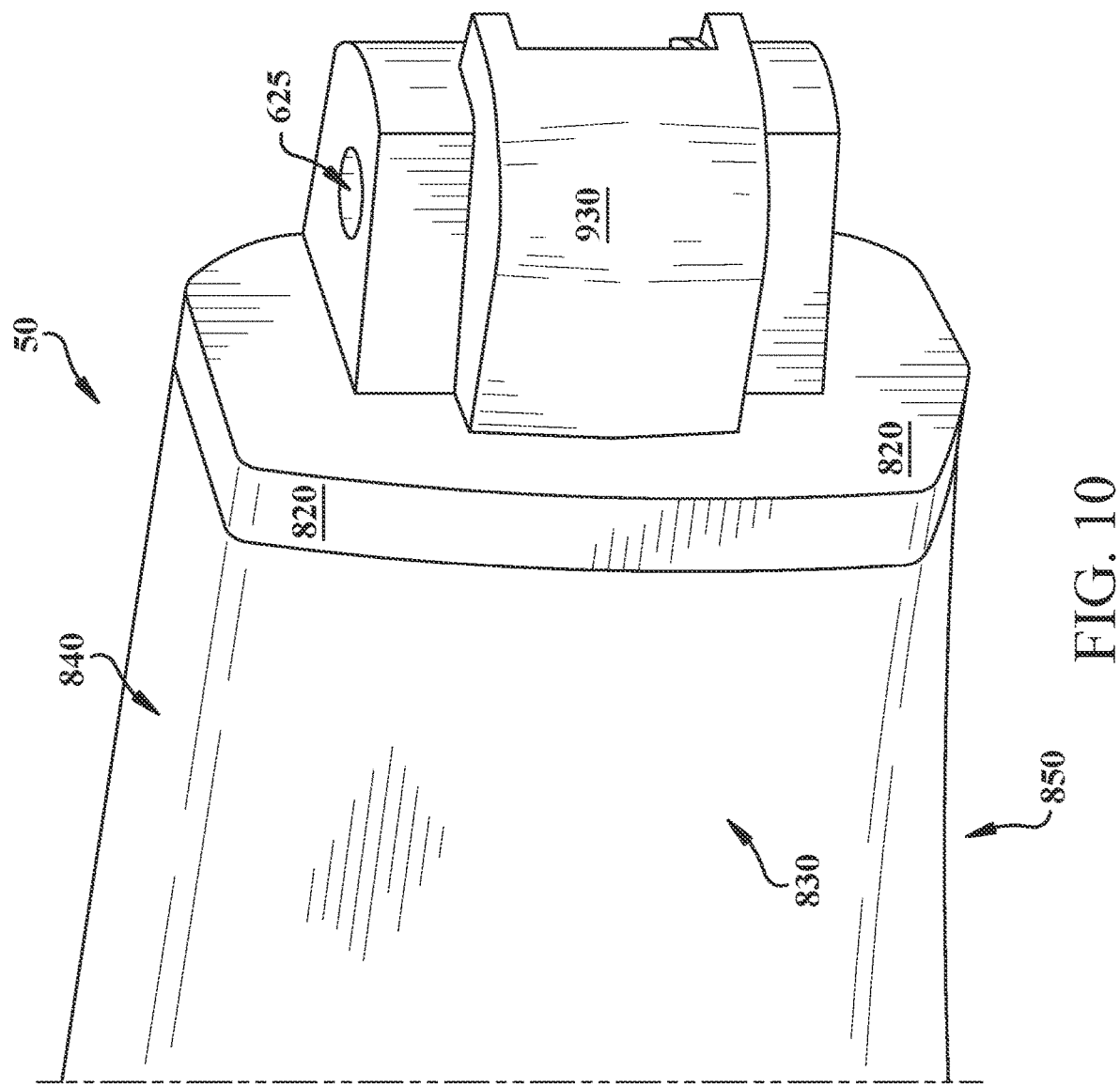
FIG. 10 shows a distinct perspective of the hinge and the section depicted in FIG. 9.

The audio eyeglasses 800 depicted in FIG. 8 can include a hinge 805 similarly described with reference to FIGS. 1 and 4-7. FIG. 9 shows a cut-away view of a portion of the hinge 805 along with the second (e.g., arm) section 50 from the perspective of the inside of the arm 50. FIG. 10 shows a portion of the hinge 805 coupled with the arm 50, from the perspective of the outside of the arm 50. These FIGURES are referred to simultaneously. In these implementations, the hinge 805 includes a hinge mechanism 810 that includes metal ledge 820 separating the first (or, lens) section 40 and each additional section (arm) 50. In various implementations, the metal ledge 820 is visible around an entirety of an interface 830 (e.g., vertical interface) between the first section 40 and the additional section 50 while the hinge 805 is in the fully open position. The metal ledge 820 is illustrated as visible proximate the outer facing surface 830 as well as the top and bottom surfaces 840, 850 of the arm 50 in FIG. 10. In various particular implementations, the metal ledge 820 remains stationary and in contact with the arm 50 throughout an entire range of motion of the hinge 805.

As shown in FIG. 9, in these implementations, the hinge mechanism 810 is coupled with the arm 50 by a first set of mating features 860. This first set of mating features 860 are further illustrated in FIGS. 11 and 12, which show a portion of the arm 50 in isolation. Mating features 860 on the hinge mechanism 810 are denoted with an "A", while mating features on the arm 50 are denoted with a "B". In this example, mating feature(s) 860A can include one or more slots while mating feature(s) 860B can include a protrusion such as a tab, bump or pillar, which in some cases includes a counter-bore for receiving a fastener 870 (FIG. 13) such as a screw, bolt, pin, rivet, etc. In various implementations, the mating features 860A on the hinge mechanism 810 are sized to receive the mating features 860B on the arm 50, e.g., as a male-female coupling. In certain cases, the mating features 860B on the arm 50 include an internal slot or groove 880 for receiving the fastener 870 (FIG. 13). In particular aspects, the mating features 860A on the hinge mechanism 810 are part of a plate 890 that fits within a slot 900 in the arm 50. The plate 890 can include a thinned section 910 extending through, and complementing, the slot 900.

Figure 11:
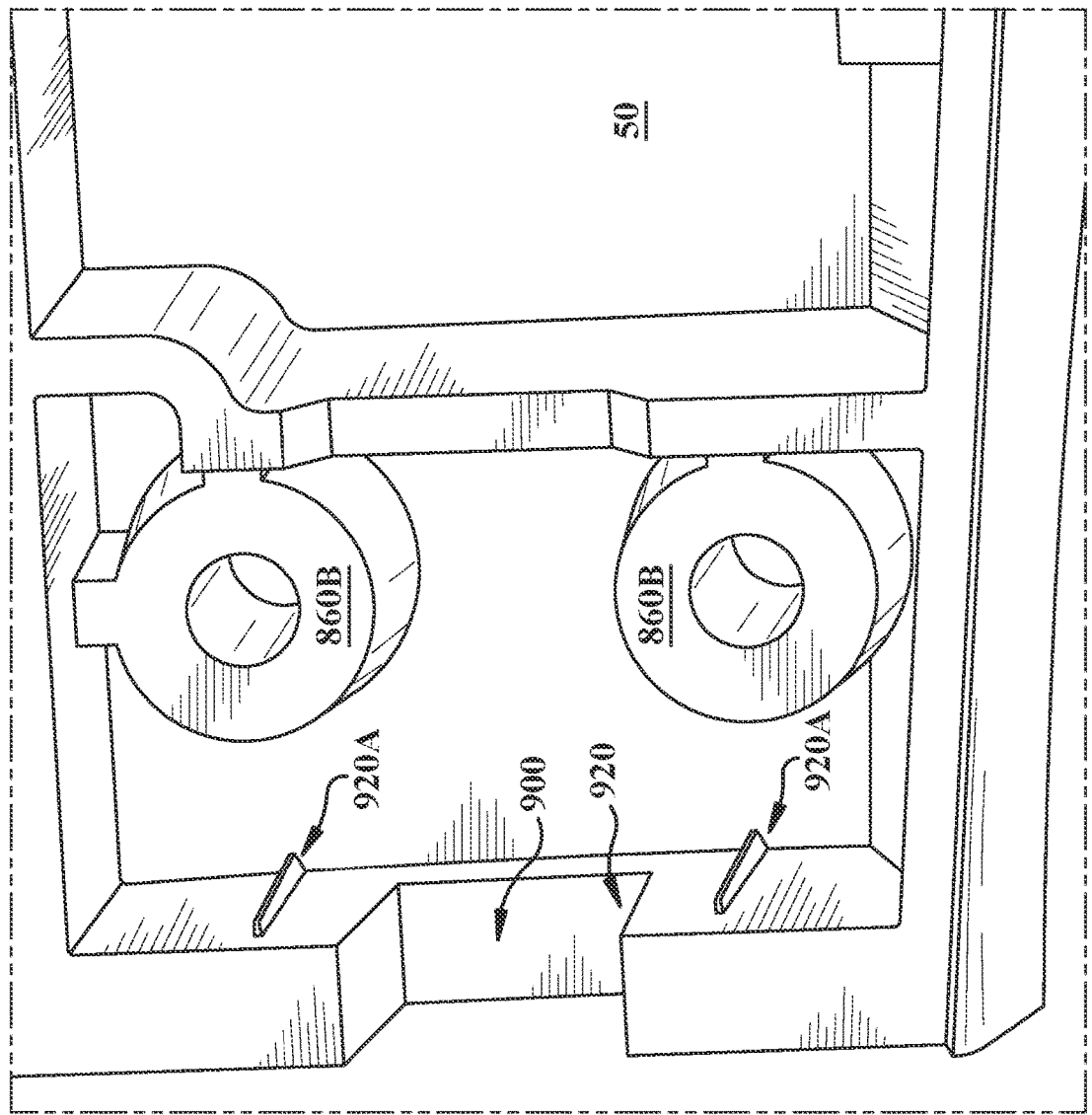
FIG. 11 is a close-up perspective of a section of a wearable audio device according to various implementations.
Figure 12:
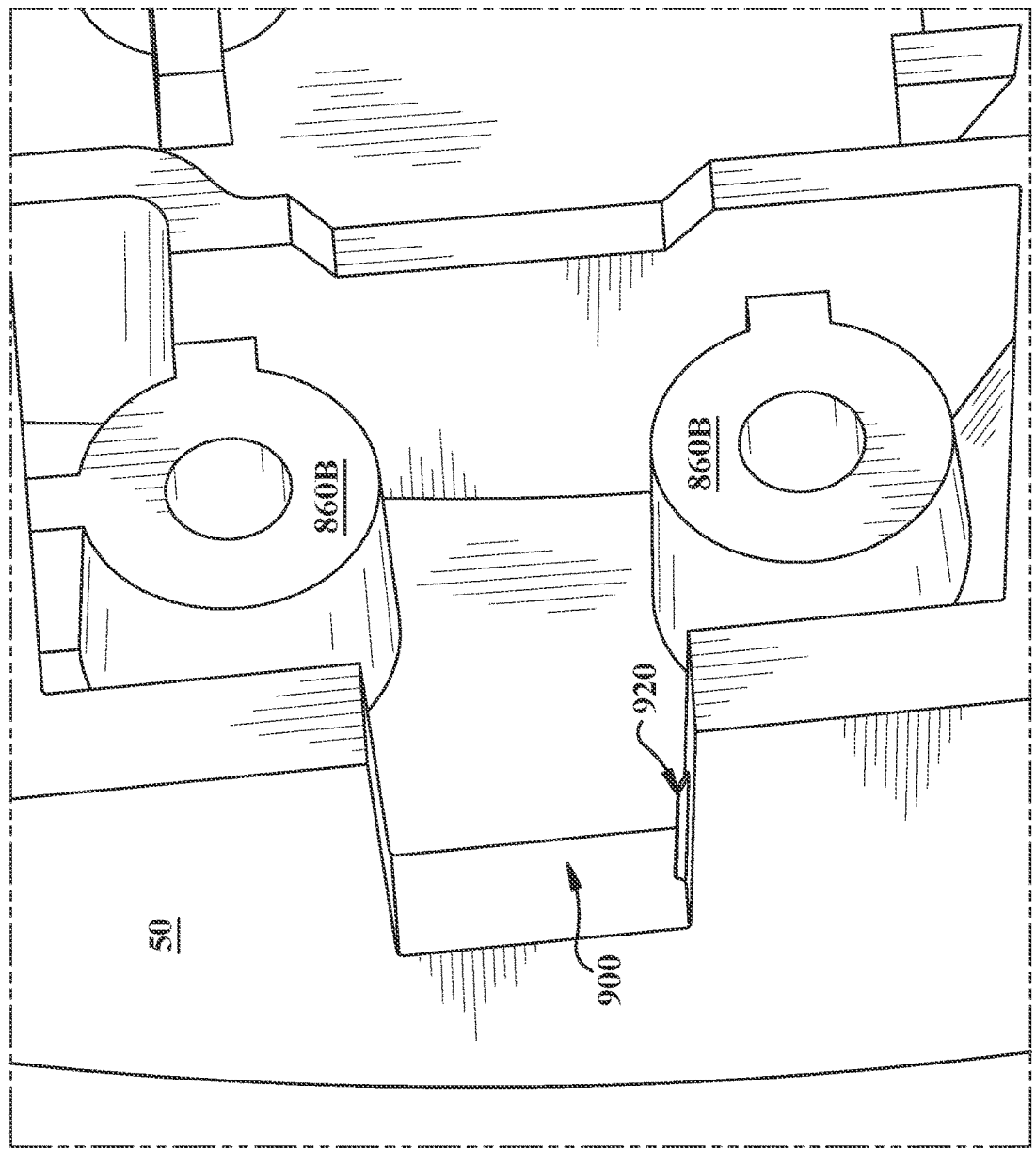
FIG. 12 shows the section depicted in FIG. 11 from a distinct perspective.
Figure 13:
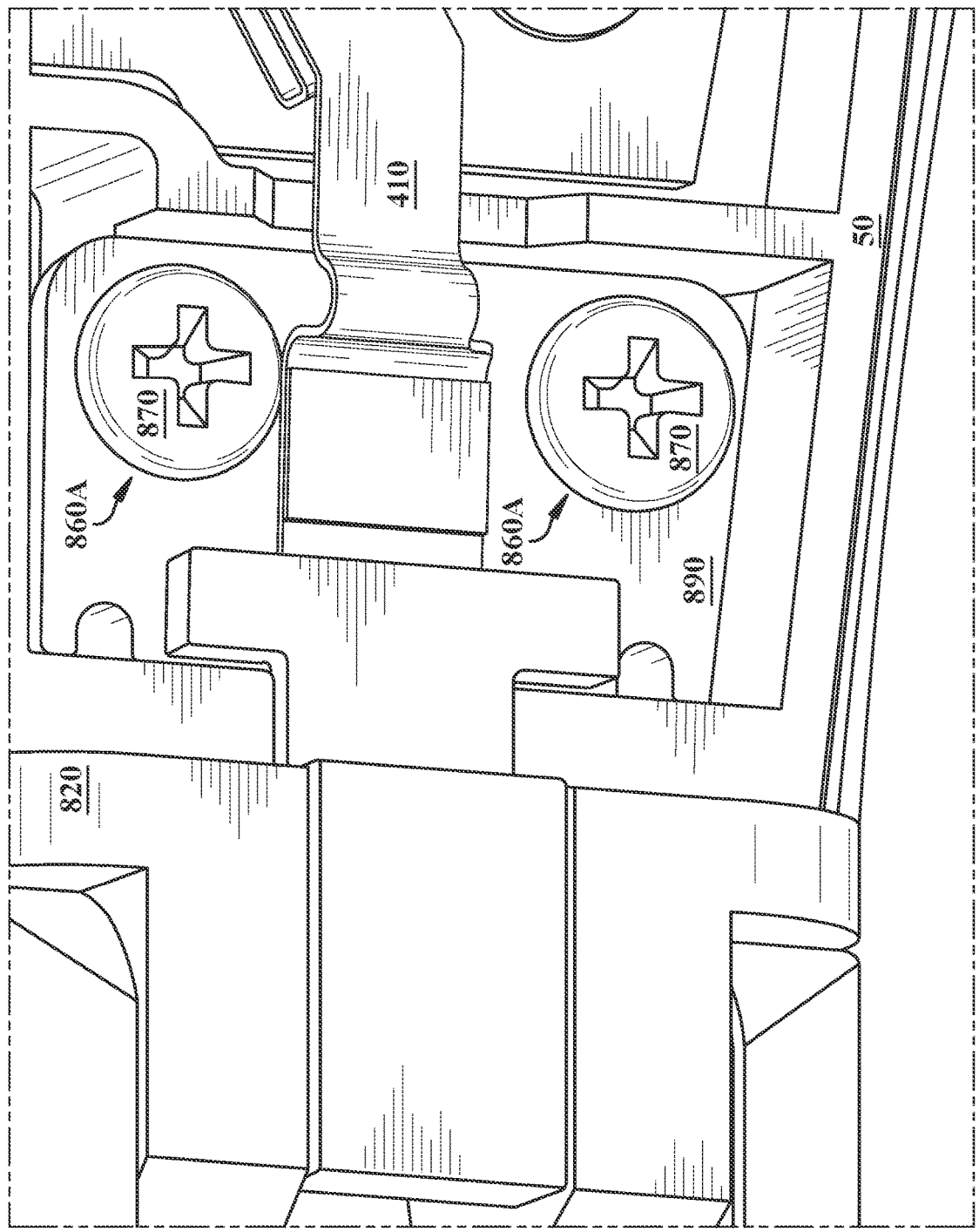
FIG. 13 is a close-up cut-away perspective of a hinge according to various implementations.

In various implementations, the hinge 805 additionally includes another set of mating features 920, illustrated in detail in FIGS. 11 and 12. In these cases, the mating features 920 includes a set of ribs configured to improve the fit of the plate 890 within the recess in the arm 50. In particular cases, these mating features 920 (e.g., ribs) are located along one or more interior surfaces of the arm 50, and in some cases, such as illustrated with mating features 920A, are vertically aligned with mating features 860B on the arm 50. Additionally, as shown in FIG. 12, a mating feature 920 such as a rib can be located in the slot 900 to contact the thinned section 910.

In certain implementations, as illustrated in FIG. 9, the hinge 805 includes a cable management feature 930 located on a distinct side of the slot 900 from the mating features 860A, 860B. In certain implementations, the cable management feature 930 and the hinge mechanism 810 are unitary and formed of a metal. FIG. 13 shows a close-up perspective view of the hinge 805 including the cable 410. As described with reference to hinge 80 in FIGS. 3-7, the cable management feature 930, hinge mechanism 810 and cable 410 (FIG. 13) in the hinge 805 are all located in a common plane (P).

In various implementations, the hinge 805 enables smooth, controlled movement of the arm 50 relative to the lens region 40 while obstructing the cable 410 from view. Additionally, the hinge 805 is configured to maintain the position of the metal ledge 820 through the entire range of motion.

Figure 14:
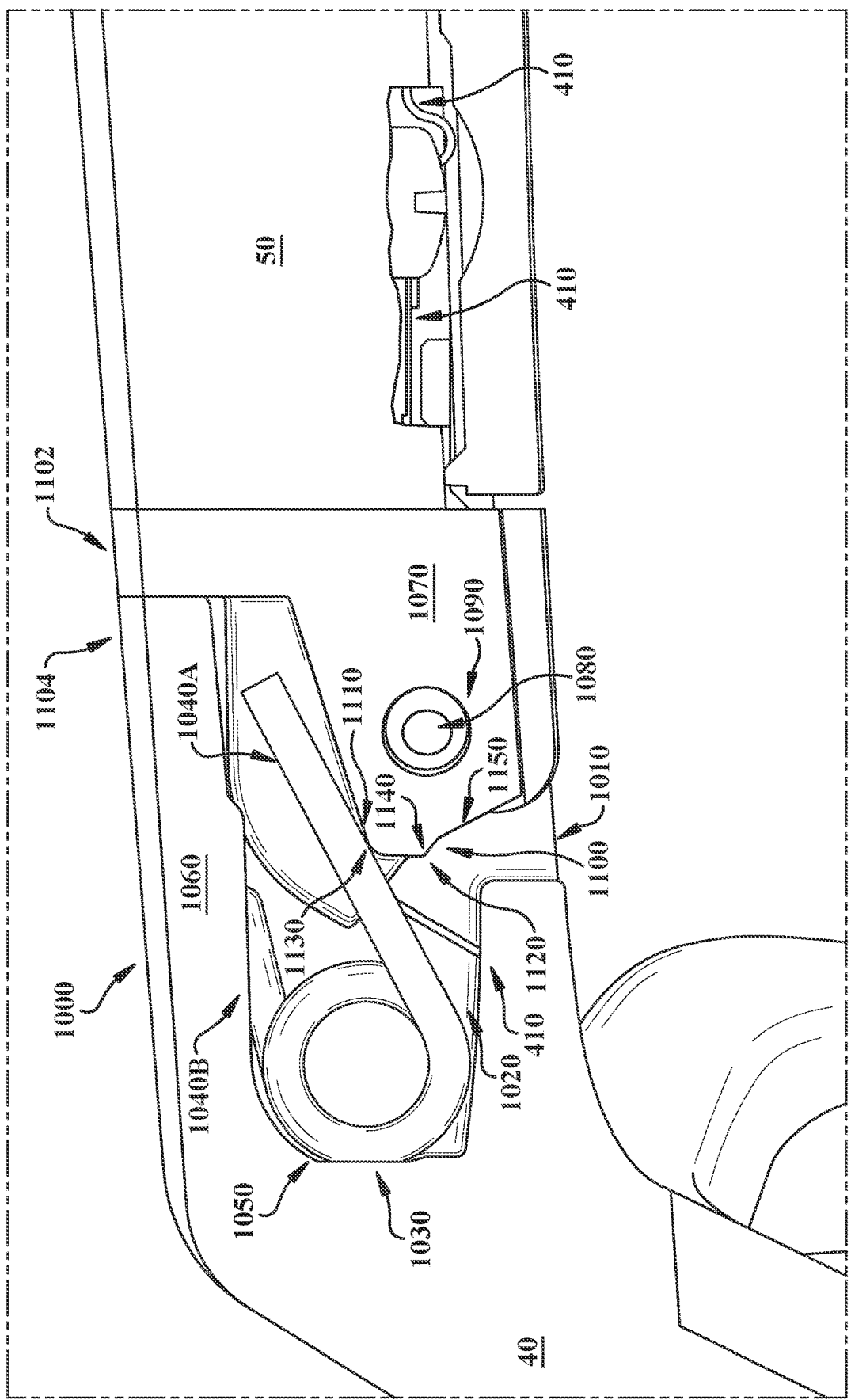
FIG. 14 is a sectional view of a portion of audio eyeglasses, including a hinge in the fully open position, according to various implementations.
Figure 15:
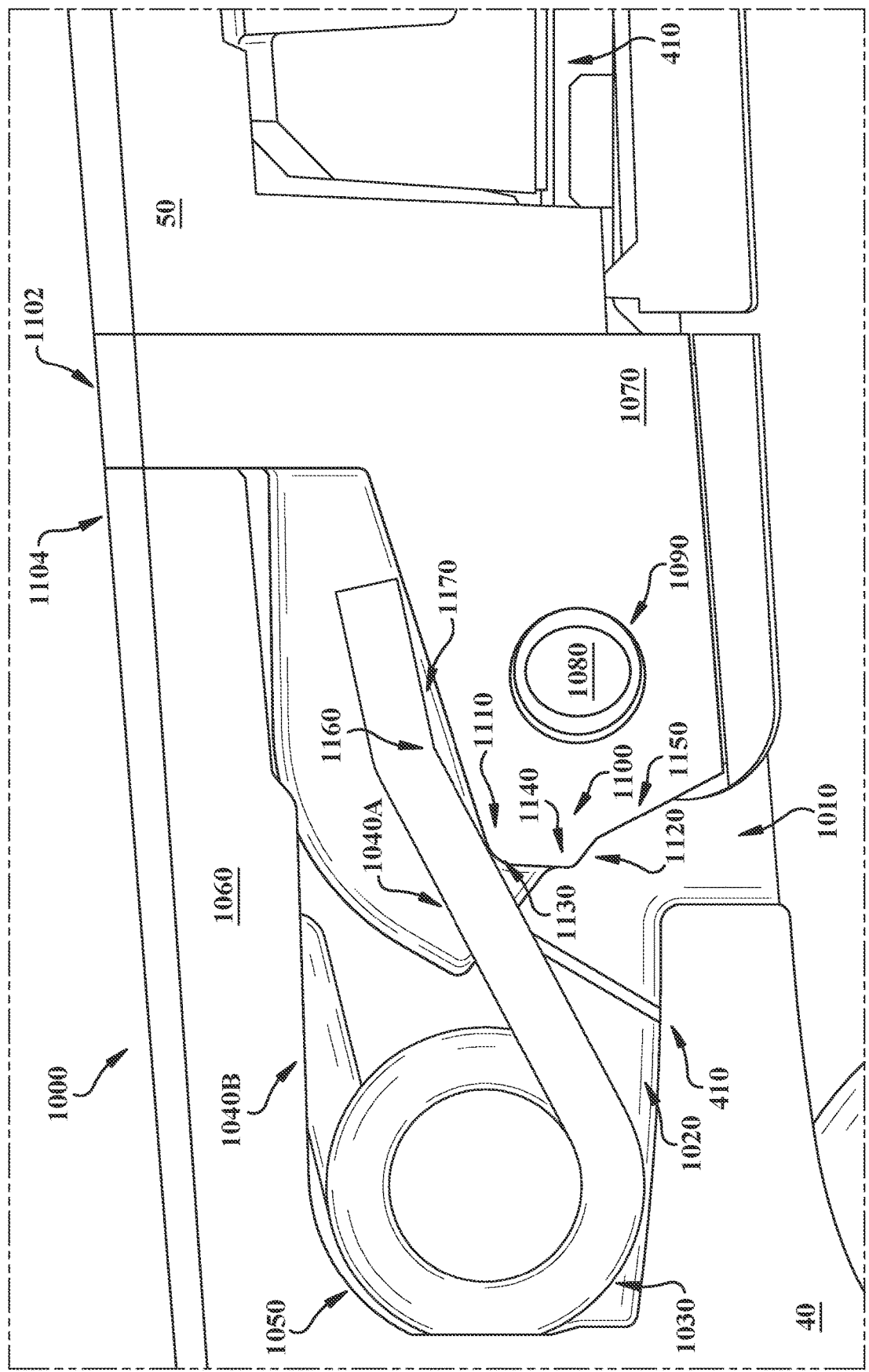
FIG. 15 is a close-up sectional view of a portion of audio eyeglasses, including a hinge in a fully open position, according to various additional implementations.
Figure 16:
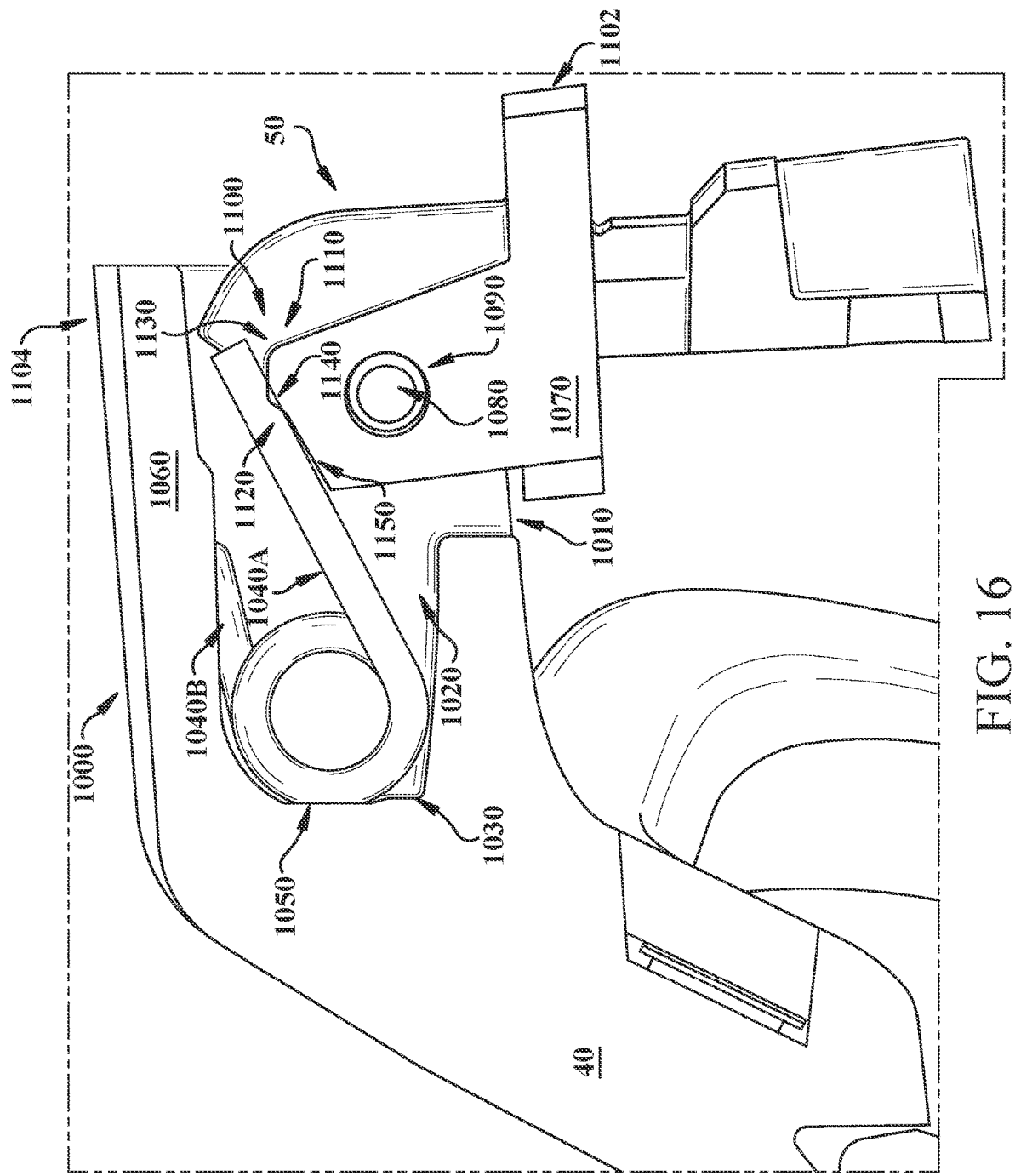
FIG. 16 is a sectional view of the portion of the audio eyeglasses from FIG. 14, with the hinge in the fully closed position, according to various implementations.

FIG. 14 is a cross-sectional depiction showing aspects of a hinge 1000 for audio eyeglasses (e.g., audio eyeglasses form of audio device 10, FIG. 1) in a fully open position according to various additional implementations. FIG. 15 is a close-up view of the hinge 1000 in the fully open position. FIG. 16 is a close-up view of the hinge 1000 in the fully closed position. These FIGURES are referred to simultaneously. As shown, hinge 1000 couples lens region 40 with one of the arms 50. In various implementations, as similarly described herein (e.g., with respect to hinge 400 in FIGS. 1-7), the hinge 1000 includes a body 1010 defining a cavity 1020 that accommodates cable 410 (e.g., spanning between openings in the cavity 1020). In various implementations, the hinge 1000 also includes a hinge mechanism 1020 within the body 1010. The hinge mechanism 1020 can include a spring 1030 (e.g., similar to spring 600, FIG. 4) located in the lens region 40. In some case, the spring 1030 includes at least one lever arm 1040 extending within the cavity 1020. In particular cases, the spring 1030 includes multiple lever arms 1040 (e.g., two lever arms, denoted by A and B, respectively) that extend from a core (coil) 1050. In particular cases, one of the lever arms 1040B contacts an inner surface of the wall 1060 of the body 1010. In certain cases, the spring 1030 is a double-torsion spring.

According to various implementations, the hinge mechanism 1020 also includes a cam member 1070 contacting the other lever arm 1040A. The cam member 1070 is configured to rotate about a pin 1080 that is accommodated by a vertically extending hole 1090 in the cam member 1070. In various implementations, the cam member 1070 includes a set of contact surfaces 1100 for directing a force from the lever arm 1040A to separately maintain the audio eyeglasses in a fully closed position and/or a fully open position, respectively. In these cases, the cam member 1070 (in particular, contact surfaces 1100) is sized and positioned to direct force from the lever arm 1040A such that the audio eyeglasses remain completely closed when positioned beyond a designated closed position (fully closed, in FIG. 16). In additional implementations, the contact surfaces 1100 are sized and positioned to direct force from the lever arm 1040A such that the audio eyeglasses remain completely open when positioned beyond a designated open position (fully open, in FIGS. 14 and 15). In certain cases, the contact surfaces 1100 of the cam member 1070 are configured to retain the audio eyeglasses in both the fully open, and fully closed positions. In particular aspects, the fully open position is defined such that the temple section 1102 of the arm 50 contacts (or sits directly adjacent to) the temple section 1104 of the lens region 40, such that the arm 50 is oriented at approximately 90 degrees relative to the lens region 40. In certain implementations, as illustrated herein, the lever arm 1040A and the cam member 1070 work in concert to retain the fully open, and fully closed, positions without any detectable kickback or movement. For example, the hinge mechanism 1020 is configured to force the audio eyeglasses 10 either open or closed when the arms 50 pass the approximately 45-degree orientation (e.g., +/−5 degrees) relative to the lens region 40. In the fully closed position, one of the arms 50 is oriented at approximately zero degrees (i.e., parallel) relative to the lens region 40. In these cases, due to interference between the arms 50, the second (or, outer) arm 50 will be unable to close at the zero-degree orientation. For example, the second, outer arm 50 can be unable to close at less than approximately a 5-degree to approximately a 25-degree orientation (e.g., approximately 15 degrees in some cases). In various implementations, the hinge mechanism 1020 forces the audio eyeglasses 10 closed when the arm 50 is below approximately the 45-degree (+/−5 degrees) angle relative to the lens region 40. As noted herein, this force can help to retain both arms 50, including the outer arm 50, in the fully closed position.

In certain cases, the contact surfaces 1100 include a first contact surface 1110 for resisting kickback from the spring 1030 when the audio eyeglasses are in the fully open position (FIG. 14). According to some implementations, the cam member 1070 also includes a second, distinct contact surface 1120 for resisting kickback from the spring 1030 when the audio eyeglasses are in a fully closed position. That is, the cam member 1070 is configured to resist kickback, or push-back from the spring 1030 in both the fully open and fully closed positions. This double-detent mechanism enables the audio eyeglasses to remain completely opened or completely closed when desired, without sliding or shifting to an intermediate position.

With particular attention to the cam member 1070, the first contact surface 1110 has a first surface profile, and the second contact surface 1120 has a second, distinct surface profile. In various implementations, the first contact surface 1110 and the second contact surface 1120 are adjacent one another, and in particular cases, are continuous with one another. In some cases, the first contact surface 1110 includes a bend (or, corner) 1130. As illustrated in the fully open position (FIGS. 14 and 15), the bend 1130 in the first contact surface 1110 can resist kickback from the spring (e.g., lever arm 1040A) when the audio eyeglasses are in a fully open position. In these cases, the lever arm 1040A applies a force to the first contact surface 1110 (e.g., at bend 1130) to maintain the fully open position regardless of an orientation of the audio eyeglasses. In particular cases, while in the fully open position, the lever arm 1040A contacts the cam member 1070 only at the bend 1130. The surface profile of first contact surface 1110 ensures that while the lever arm 1040A contacts that surface (e.g., at bend 1130), the audio eyeglasses remain in the fully open position.

In the fully closed position (FIG. 16), the surface profile of the second contact surface 1120 resists kickback from the lever arm 1040A to prevent the audio eyeglasses from opening. In some particular cases, when in the fully closed position, the lever arm 1040A applies a force to the second contact surface 1120 to maintain the fully closed position regardless of an orientation of the audio eyeglasses. In particular implementations, the second contact surface 1120 has a protrusion 1140 that is positioned to contact the lever arm 1040A when the audio eyeglasses are in the fully closed position. Adjacent the protrusion 1140 is a notch 1150 (or, recess) that limits an area of contact (in the second contact surface 1120) with the lever arm 1040A. In these cases, as illustrated in the fully closed eyeglasses in FIG. 16, the lever arm 1040A applies a force to the second contact surface 1120 at the protrusion 1140. In other terms, in the fully closed position, the lever arm 1040A contacts the cam member 1070 only at the protrusion 1140 in the cam member 1070. That is, the force applied from the lever arm 1040A is delivered directly to the protrusion 1140, e.g., at a force vector angle that resists kickback.

In certain implementations, as illustrated in the example depiction of the fully opened audio eyeglasses in FIG. 15, the lever arm 1040A can include a notch 1160 in a contact surface 1170 (e.g., the surface that contacts cam member 1070) that complements the protrusion 1140 in the second contact surface 1120. In these cases, the protrusion 1140 can rest within the notch 1160 in the lever arm 1040A while the audio eyeglasses are in the fully closed position. In these implementations that include the notch 1160, while in the open position, the lever arm 1040A still contacts the cam member 1070 only at the bend 1130.

As shown and described herein, the cam member 1070 can effectively control the force vector angle applied by the lever arm 1040A in one or both of the fully opened or fully closed positions. In certain cases, the cam member 1070 enables double-detent functions of the hinge mechanism 1020, such that the audio eyeglasses are configured to remain in the fully open and fully closed positions, respectively. That is, the hinge mechanism 1020 allows the user to place the audio eyeglasses 10 (FIG. 1) in the fully open position and/or the fully closed position, without kickback (or pushback) of the arms 50 relative to the lens region 40. In these cases, after engaging the fully open or fully closed position (e.g., relative to bend 1130 in cam member 1070), the user can place the audio eyeglasses 10 (FIG. 1) in any orientation and the hinge mechanism 1020 will maintain the fully open or fully closed position. For example, a user can fully close the audio eyeglasses 10 and place the audio eyeglasses 10 with the lens region 40 facing up, and the arms 50 will remain in the fully closed position relative to the lens region 40. This can be beneficial when placing the audio eyeglasses 10 into a case, or resting the audio eyeglasses 10 on a surface where a user does not want to risk scratching the lenses 60 (FIG. 1). In other examples, the user may wish to temporarily remove the audio eyeglasses 10 from her head, e.g., to look at something more closely or to clean the lenses 60. In certain of these examples, the user removes the audio eyeglasses 10 with a single hand. In these cases, the user may appreciate that the audio eyeglasses 10 remain in the fully open position, so that they can be easily placed back on her head after a short period. Additionally, where the audio eyeglasses 10 are able to stay in the fully open position in the above-noted example, the user can more easily place those audio eyeglasses 10 on a surface (e.g., upright, as shown in FIG. 1) without having to adjust the arms 50 relative to the lens region 40. The above-noted examples are merely some of the many circumstances in which a user can benefit from audio eyeglasses 10 with a double-detent hinge mechanism. These audio eyeglasses 10 disclosed according to various implementations can improve the user experience and enable greater longevity and functionality when compared with conventional devices.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

The invention claimed is:

1. Audio eyeglasses, comprising:
a frame for resting on a head of a user, the frame comprising: a lens region; a pair of arms extending from the lens region; a hinge coupling each of the pair of arms with the lens region; and a cable extending through each hinge, wherein each hinge comprises:
a body defining a cavity accommodating the cable; and
a hinge mechanism within the body, the hinge mechanism comprising:
a spring located in the lens region, the spring comprising at least one lever arm extending within the cavity; and
a cam member contacting the lever arm of the spring, wherein the cam member comprises: a first contact surface for resisting kickback from the spring when the audio eyeglasses are in a fully open position, and a second, distinct contact surface for resisting kickback from the spring when the audio eyeglasses are in a fully closed position.

2. The audio eyeglasses of claim 1, wherein the first contact surface has a first surface profile and the second contact surface has a second, distinct surface profile.

3. The audio eyeglasses of claim 1, wherein the second contact surface has a notch that limits an area of contact with the at least one lever arm.

4. The audio eyeglasses of claim 3, wherein in the fully closed position, the at least one lever arm applies a force to the second contact surface to maintain the fully closed position regardless of an orientation of the audio eyeglasses wherein in the fully open position, the at least one lever arm applies a force to the first contact surface to maintain the fully open position regardless of an orientation of the audio eyeglasses.

5. The audio eyeglasses of claim 1, further comprising a pin about which the cam is configured to rotate, wherein the cam comprises a vertically extending hole accommodating the pin, wherein the spring comprises a double-torsion spring.

6. The audio eyeglasses of claim 1, wherein the lever arm comprises a notch in a contact surface that complements a protrusion in the second contact surface.

7. The audio eyeglasses of claim 1, further comprising:
an electro-acoustic transducer at least partially housed in the frame and comprising a sound-radiating surface for providing an audio output; and
at least one microphone in the frame, wherein each hinge permits movement of one of the pair of arms relative to the lens region.

8. The audio eyeglasses of claim 1, wherein the cavity has a first opening to a pathway in the lens region, and a second opening to an additional pathway in the arm, wherein the cable comprises a printed circuit board (PCB), and wherein the PCB is thinner in a region contained within the hinge than in a distinct region within the pathway or the additional pathway.

9. Audio eyeglasses, comprising:
a frame for resting on a head of a user, the frame comprising: a lens region; a pair of arms extending from the lens region; a hinge coupling each of the pair of arms with the lens region; and a cable extending through each hinge, wherein each hinge comprises:
a body defining a cavity accommodating the cable; and
a hinge mechanism within the body, the hinge mechanism comprising:
a spring located in the lens region, the spring comprising at least one lever arm extending within the cavity; and
a cam member contacting the lever arm of the spring, wherein the cam member comprises a notch along a contact surface for resisting kickback from the spring when the audio eyeglasses are in a fully closed position.

10. The audio eyeglasses of claim 9, wherein the cam member comprises a bend for resisting kickback from the spring when the audio eyeglasses are in a fully open position.

11. The audio eyeglasses of claim 9, wherein the cam comprises a protrusion adjacent to the notch.

12. The audio eyeglasses of claim 11, wherein in the fully closed position, the at least one lever arm contacts the cam member only at the protrusion.

13. The audio eyeglasses of claim 11, wherein the lever arm comprises a notch in a contact surface to complement a protrusion in the second contact surface.

14. The audio eyeglasses of claim 9, further comprising a pin about which the cam is configured to rotate, wherein the cam comprises a vertically extending hole accommodating the pin.

15. The audio eyeglasses of claim 9, wherein the spring comprises a double-torsion spring.

16. The audio eyeglasses of claim 9, further comprising:
   an electro-acoustic transducer at least partially housed in the frame and comprising a sound-radiating surface for providing an audio output; and
   at least one microphone in the frame, wherein each hinge permits movement of one of the pair of arms relative to the lens region.

17. Audio eyeglasses, comprising:
   a frame for resting on a head of a user, the frame comprising: a lens region; a pair of arms extending from the lens region; a hinge coupling each of the pair of arms with the lens region; and a cable extending through each hinge, wherein each hinge comprises:
   a body defining a cavity accommodating the cable; and
   a hinge mechanism within the body, the hinge mechanism comprising:
      a spring located in the lens region, the spring comprising at least one lever arm extending within the cavity; and
      a cam member contacting the lever arm of the spring, wherein the cam member comprises a set of contact surfaces for directing a force from the at least one lever arm to separately maintain the audio eyeglasses in a fully closed position, and a fully open position, respectively.

18. The audio eyeglasses of claim 17, wherein the cable comprises a printed circuit board (PCB).

19. The audio eyeglasses of claim 1, wherein the cable comprises a printed circuit board (PCB).

20. The audio eyeglasses of claim 9, wherein the cable comprises a printed circuit board (PCB).

* * * * *